(12) United States Patent
Barbour et al.

(10) Patent No.: US 6,940,868 B1
(45) Date of Patent: Sep. 6, 2005

(54) DIGITAL SERIAL COMMUNICATIONS HUB

(75) Inventors: Erskine R. Barbour, Benson, NC (US); Carl J. Laplace, Jr., Raleigh, NC (US)

(73) Assignee: ABB Inc., Norwalk, CT (US)

( * ) Notice: Subject to any disclaimer, the term of this patent is extended or adjusted under 35 U.S.C. 154(b) by 0 days.

(21) Appl. No.: 09/295,163

(22) Filed: Apr. 20, 1999

(51) Int. Cl.[7] ............................. H04J 3/16; H04J 3/22; H04B 7/14; H04B 3/36; H04B 1/38
(52) U.S. Cl. ................... 370/466; 370/279; 370/315; 370/293; 375/222
(58) Field of Search ............................. 370/465–470, 370/252, 401–402, 294, 521, 463, 279, 293, 370/315; 359/113, 118, 128, 110; 709/232, 709/401; 714/774, 776; 375/222

(56) References Cited

U.S. PATENT DOCUMENTS

| | | | |
|---|---|---|---|
| 3,775,751 A * | 11/1973 | Anderson | 340/172.5 |
| 4,972,463 A | 11/1990 | Danielson et al. | 379/91 |
| 5,020,020 A | 5/1991 | Pomfret et al. | 364/900 |
| 5,193,149 A | 3/1993 | Awiszio et al. | 395/200 |
| 5,209,560 A * | 5/1993 | Taylor et al. | 362/85 |
| 5,390,038 A | 2/1995 | Cecchini | 359/113 |
| 5,398,241 A | 3/1995 | Witchey | 370/84 |
| 5,425,051 A | 6/1995 | Mahany | 375/202 |
| 5,434,980 A | 7/1995 | Casper et al. | 395/275 |
| 5,459,578 A * | 10/1995 | Park et al. | 356/374 |
| 5,469,545 A | 11/1995 | Vanbuskirk et al. | 395/200.01 |
| 5,483,372 A * | 1/1996 | Green, Jr. | 398/175 |
| 5,485,590 A | 1/1996 | Hyatt et al. | 395/442 |
| 5,537,558 A | 7/1996 | Fletcher et al. | 395/309 |
| 5,537,646 A | 7/1996 | Buck et al. | 395/500 |
| 5,546,385 A | 8/1996 | Caspi et al. | 370/58.2 |
| 5,553,271 A | 9/1996 | Hile et al. | 395/500 |
| 5,555,421 A | 9/1996 | Enzinna | 395/750 |
| 5,613,096 A | 3/1997 | Danknick | 395/500 |
| 5,668,810 A | 9/1997 | Cannella, Jr. | 370/392 |
| 5,696,994 A | 12/1997 | Pang | 395/884 |
| 5,717,737 A | 2/1998 | Doviak et al. | 379/58 |
| 5,727,170 A | 3/1998 | Mitchell et al. | 395/285 |
| 5,754,789 A | 5/1998 | Nowatzyk et al. | 395/200.63 |
| 5,818,821 A | 10/1998 | Schurig | 370/293 |
| 5,818,842 A | 10/1998 | Burwell et al. | 370/397 |
| 6,272,529 B1 * | 8/2001 | Lum | 709/203 |
| 6,311,204 B1 * | 10/2001 | Mills | 709/100 |
| 6,505,220 B1 * | 1/2003 | Ikeda | 708/212 |

* cited by examiner

*Primary Examiner*—Chi Pham
*Assistant Examiner*—Ronald Abelson
(74) *Attorney, Agent, or Firm*—Woodcock Washburn LLP

(57) ABSTRACT

A digital serial communications hub has the ability to delay, route and regenerate data on the fly at mixed baud rates, mixed character framing bits, and mixed protocols without prior setup. In addition, the communications hub stores and retrieves serial data in the time domain, and employs a simple and reliable error correction routine that takes advantage of the time domain format of the data. Physically, the communications hub is implemented as a circuit card integrating a central processor with several serial communications ports. The serial ports connect to a combination of electrical interfaces that include RS232, RS485, TTL, and Fiber Optic. The serial communication ports are routed through a central flow processor that controls data flow into and out of the circuit card via serial communications connectors.

18 Claims, 3 Drawing Sheets

DIGITAL SERIAL COMMUNICATIONS HUB

FIELD OF THE INVENTION

The present invention relates generally to the fields of digital communications and electrical power transmission and distribution, and more particularly to a digital serial communications hub that delays, regenerates and routes data for the utility power transmission and distribution industry.

BACKGROUND OF THE INVENTION

Digital communications devices are used by the electric utility industry, and other industries, for communicating measured data, such as data representing a customer's power consumption. A goal of the present invention is to provide a communications device (or hub) capable of delaying, routing and regenerating data at mixed baud rates, mixed character framing bits and mixed protocols (such as RS-232, RS485, Fiber Optic, and the like).

SUMMARY OF THE INVENTION

The present invention is suitable for use in a digital serial communications hub comprising a controller and a plurality of receiver-transmitter units. In accordance with the invention, controller is programmed to delay, route and regenerate data at mixed baud rates, mixed character framing bits and mixed protocols. This is accomplished by, in part, digitizing and quantizing all incoming data in the time domain.

In a presently preferred implementation of the invention, the controller is further programmed to filter for error correction and store in memory the time domain data. The controller may also be programmed to perform the steps of: (1) measuring the received data's transition times in the time domain, and storing in memory the measured time values; (2) analyzing the stored time values to determine if any error correction should be applied to the values and, if so, applying an error correction procedure to the values in need of error correction; and (3) reconstructing the received data with error correction.

The error correction procedure of step (2) preferably comprises determining a common denominator of a standard baud rate, wherein the common denominator is a unit of time equal to the time employed to transmit a single bit at a certain baud rate; dividing each measured time value of the received data by the common denominator; and rounding off each measured time value to a closest interval equal to an integral number of common denominator periods. In addition, the controller may be a microcontroller including a time module, and the step of reconstructing the received data may be performed by sequentially moving the time values into the timer module where they are used to reconstruct the data, including the use of a port identifier associated with the received data to determine the port(s) on which the data will be retransmitted. The controller may also be programmed to delay retransmission of the received data.

Other aspects of the present invention are described below.

DETAILED DESCRIPTION OF PREFERRED EMBODIMENTS

Overview

Figure 1:
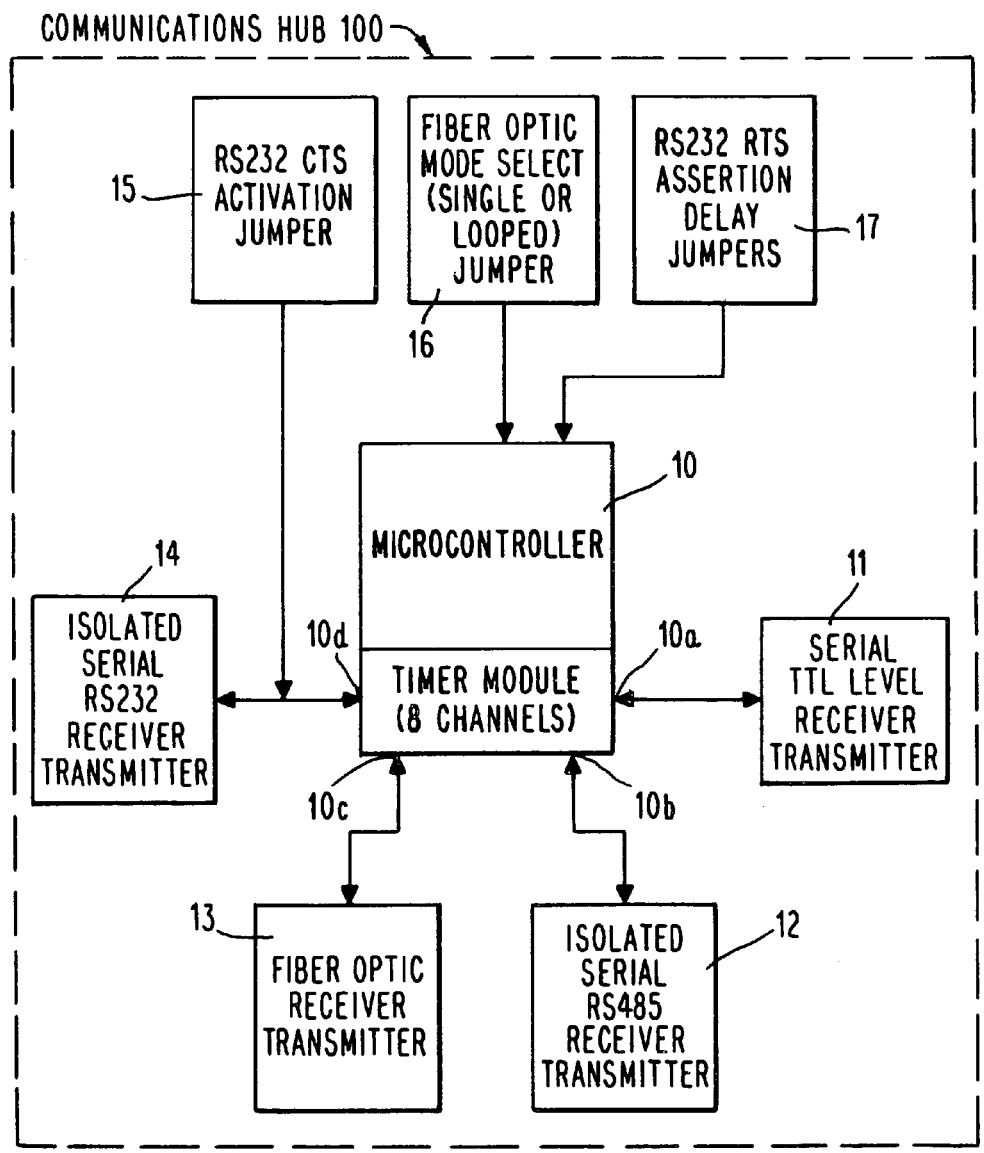
FIG. 1 schematically depicts an exemplary embodiment of a digital serial communications hub in accordance with the present invention.

FIG. 1 is a block diagram of a presently preferred embodiment of a serial communications hub 100 in accordance with this invention. As shown, the serial communications hub 100 includes a central processor 10; a plurality of serial communication and 17.

Physically, the communications hub 100 may be implemented as a circuit card integrating the central processor 10 with the serial communications ports. The serial ports connect to the desired combination of electrical interfaces, which in this example include a TTL interface 11, an RS485 interface 12, a Fiber Optic interface 13, and an RS232 interface 14. The central processor 10 controls data flow into and out of the circuit card via the serial communications ports and connectors.

Functionally, the serial communications hub 100 integrates and manages the routing and re-generation of several serial communications sources to adapt to a variety of communications networks. One particularly beneficial function of the serial communications hub 100 is its ability to delay, route and regenerate data on the fly at mixed baud rates, mixed character framing bits, and mixed protocols. This is accomplished without any setup prior to operation, such as selecting baud, number of stop bits, number of data bits, etc. To accomplish this, all incoming data is digitized and quantized in the time domain. The time values are then filtered for error correction and stored in memory. Upon re-transmission, the time values are used to reconstruct the data and on the proper ports. Advantages of this approach include the ability to store, recall, route and error correct data without any prior knowledge of data formatting or protocol. In addition, the invention provides an adaptable RS232 hardware handshaking feature to assist in applications requiring radio communications. These features are ideally suited to distribution automation utility applications where a variety of physical interfaces and networks need to be inter-connected with minimum set-up and configuration.

A presently preferred embodiment of the invention will now be described with reference to FIGS. 1–4.

Exemplary Embodiment of Digital Serial Communications Hub

The serial communications hub 100 has a TTL port, an isolated RS232 port, an isolated RS485 port, and a Fiber Optic port. The central processor 10 for this hub (e.g., a Motorola MC68HC912B32 microcontroller) is equipped with eight timer pins that may be assigned to perform input or output activities. Four of the timer pins are assigned as input pin and four are assigned as output pins. One output pin and one input pin are connected to each of the four serial communication ports. The hardware that supports each port on the hub controls the voltage level conversions to and from the microcontroller.

The hub may be incorporated into another device, such as ABB Power T&D Company's PCD2000 POWER CONTROL DEVICE, or it could packaged as a stand alone product. Whether the hub is a stand alone unit or is incorporated into a larger unit, the end result is that it provides an efficient, flexible and low cost means to inter-connect multiple communication networks and physical interfaces. The network topologies include looped, star and point-to-point networks. The hub may also act as a communications bridge between the various physical interfaces (i.e., RS232, RS485, TTL, and fiber). The design is tailored to match the needs of the utility power transmission and distribution industry.

The hub's ability to delay, route and regenerate data on the fly at mixed baud rates, mixed character framing bits and mixed protocols, without any setup prior to operation (such as selecting baud, number of stop bits, number of data bits, etc.), is accomplished by digitizing and quantizing all incoming data in the time domain. The time values are then filtered for error correction and stored in memory. Upon re-transmission, the time values are used to reconstruct the data on the proper ports. This procedure can be broken down into three steps:

1. All data received from the hub's serial communications ports are delivered to one of the microcontroller's timer input pins. The received data's transition times are measured in the time domain by the microcontroller's time module. These time measurement values are then stored in the microcontroller memory in addition to its source identity.

2. The stored time values are then analyzed to determine if any error correction should be applied to the values. This determination is made by a simple firmware error correction routine. The foundation of the error correction routine is based on the principle that standard baud rates are derived from a common denominator. That common denominator is a unit of time equal to the time necessary to transmit a single bit at the highest speed baud rate under consideration. If the maximum baud is 19,200, the period would be 52 microseconds. In the exemplary embodiment, all standard baud rates at 19,200 and less are made up of multiple units of 52 microseconds. When the received data pulse is converted into a time value, that value is divided by 52 microseconds. The remainder from this division will determine the amount of error adjustment applied to the time value. If the remainder is less than half of 52 microseconds, then the remainder amount is added to the time value. If the remainder is greater than half of 52 microseconds, then the remainder amount is added to the time value. The objective is to round off the time measurements to the closest 52 microsecond interval. The maximum amount of signal correction is about 26 microseconds. Even though the amount of correction is small, this action supports networks that are looped. This is because a small amount of distortion is introduced into the data during transmission by the transmission medium. This distortion may be a small amount when a single transmission and reception is considered but, when large networks are employed, the distortions may become amplified and result in an unreliable signal path.

3. The time values are sequentially moved back into the microcontroller's timer module where they are used to reconstruct or play back the data as received (including error adjustments). The port identifier associated with the received data will now be used to determine the ports on which the data will be re-transmitted. As a general rule, the data will then be transmitted over all ports except for the port where the data was received. This is basically the way all data is handled by the board. An exception is when a looped fiber network is employed. In this mode, all data received by the fiber optic port is transmitted back out the fiber optic port in addition to the usual transmission by all other ports.

There is also a delay function incorporated into the hub 100. This function is used to support radio communications via the RTS (Ready To Send) and CTS (Clear To Send) lines on the RS232 interface. Some radio receiver-transmitters need time to make their transmitter operational before they can transmit. The hub can assist in supporting this by activating the RS232 port RTS line to the radio to inform the radio that it has data ready to be transmitted. The radio then activates its transmitter. Next, the radio activates the CTS control line attached to the hub to indicate that the radio is ready to transmit. The hub then releases all data for transmission. The maximum amount of time that data may be delayed is dependent on memory storage, baud rate, character framing, protocol, and data transmissions.

An internal timing operation using the microcontroller 10 in conjunction with a 16 MHz crystal is as follows: The firmware initializes the microcontroller's timer module such that the minimum unit of time resolution is 125 nanoseconds and the maximum amount of time that can be accumulated without register overflow is 819 milliseconds. The firmware makes use of sixteen bits of timer resolution available from the microcontroller's timer module to accomplish this. The amount of time needed to receive, error correct and retransmit a single bit of data is 41 microseconds. This defines the minimum and maximum pulse widths of 41 microseconds to 819 milliseconds. These times equate to a minimum baud of 1,200 and a maximum baud of 19, 200.

Figure 2:
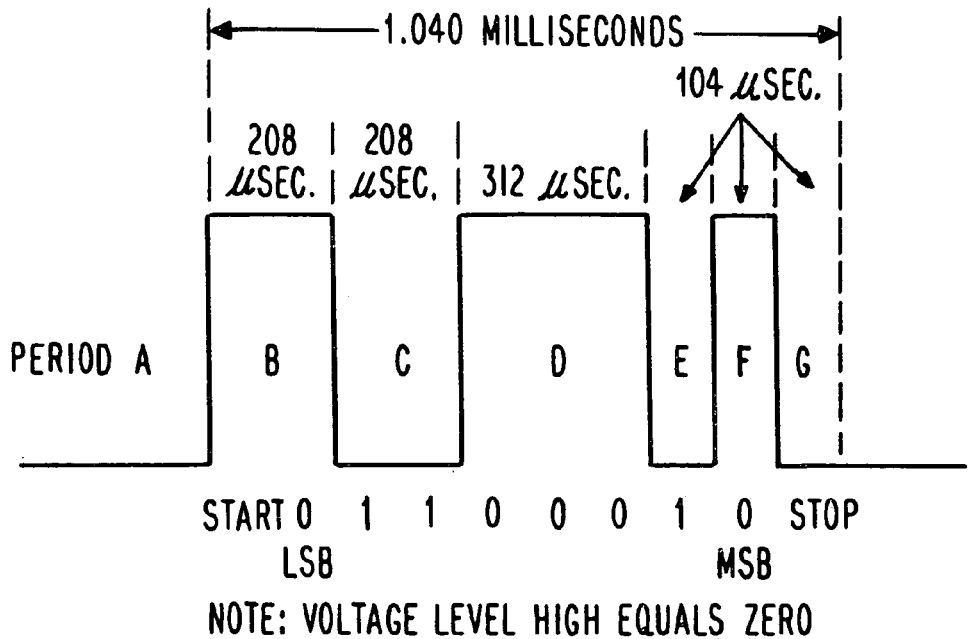
FIGS. 2 and 3 depict exemplary waveforms for explaining a time domain error correction procedure in accordance with the present invention. In particular, these figures show a plot similar to a plot that would be displayed on an oscilloscope of an RS232 serial transmission of an uppercase "F" character (hex character 46) at 9600 baud, 8 data bits, no parity, and one stop bit. In this example, a single bit width at 9600 baud is reduced from 104.166 . . . microseconds to 104 microseconds.

FIG. 2 depicts a time domain encoding process in accordance with the present invention. The waveform shown in FIG. 2 is similar to a plot that would be displayed on an oscilloscope of an RS232 serial transmission of an upper-case "F" character (hex character 46) at 9600 baud, 8 data bits, no parity, and one stop bit. For simplification reasons a single bit width at 9600 baud is reduced from 104.166 . . . microseconds to 104 microsecond. When the signal is received by a UART (Universal Asynchronous Receiver-Transmitter), it is decoded to the hexadecimal value of 46. This value may then be stored in memory requiring only one byte of memory storage. A disadvantage with this process is that the UART will have to be preset before receiving the signal to match the incoming signal's baud and framing information.

To receive the same signal and store that signal in the time domain, the following hexadecimal values would be stored in memory. A through F represents the signal's time periods:

Period A: FF:FF
Period B: 06:80
Period C: 06:80
Period D: 09:C0
Period E: 03:40
Period F: 03:40
Period G: FF:FF Each value requires a word (2 bytes) of memory storage to store the time for that period. The amount of time the microcontroller needs to increment its internal timer/counter module by one unit is 125 nanosecond, and so the values listed represent time in 125 nanosecond units (in hexadecimal values). For example Time Period B is 208 microseconds. Divide 208 microseconds by 125 nanosecond and the result is 1664. 1664 in hexadecimal is 680. This value is stored in two memory locations as 06 in the high byte and 80 in the low byte.

The high/low state of the line (meaning whether it is at a high or low voltage level) when timed is not directly encoded. There is no way to pick a value at random and then from that value to determine if the output line was high or low when timed except if the value is FFFF. If the value is FFFF, then input line was at voltage low. To further explain, the associated timer for any input line is set to stop timing and store that period's timed value and then start timing a new period at any logic transition (high to low or low to high) on that input line. If a timer that is timing an input overwrites itself, meaning it overwrites its starting point (decimal 65,535 total clicks to over write), then the value of FFFF is stored for that period. The only way a timer will overwrite on a properly operating system is when there is no data being transmitted and therefore the communications line is low. When the signal is reconstructed for transmission and the value of FFFF is extracted from memory, the firmware will set the associated output pin for that line low. It will remain low for FFFF times 125 nanoseconds. The output line will toggle states each time a new value is extracted from memory from that point on. Basically the FFFF values are used to ensure that the high/low state of the output line is in synchronization with the input line when the value was stored. All received data will end with a voltage low state resulting in a value of FFFF, so the output line will remain low at the end of timing this value.

Figure 3:
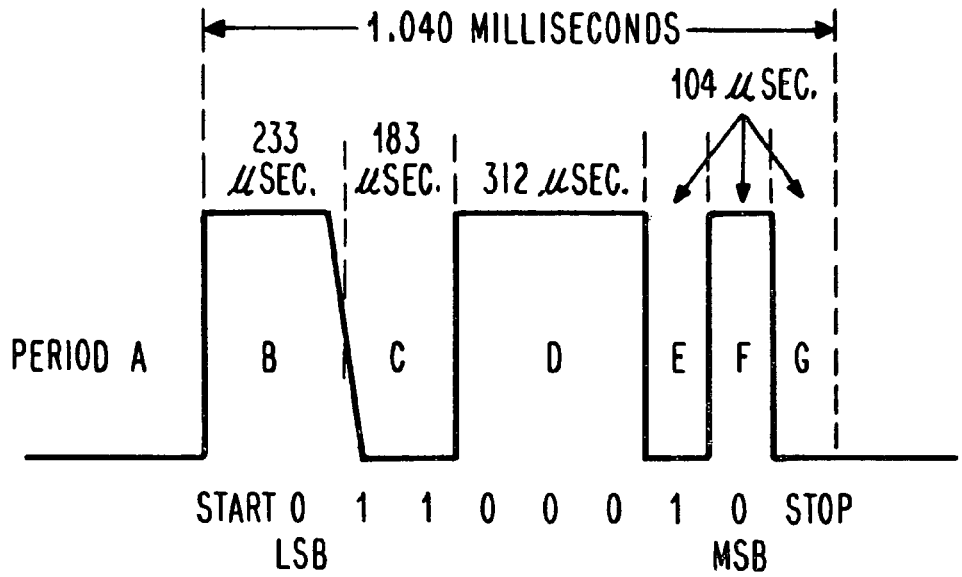

FIG. 3 depicts a time domain error correction process in accordance with the present invention. The waveform shown in FIG. 3 is similar to a plot that would be displayed on an oscilloscope of an RS232 serial transmission of an uppercase "F" (hex character 46) character at 9600 baud, 8 data bits, no parity, and one stop bit. For simplification reasons, a single bit width at 9600 baud is reduced from 104.166 . . . microseconds to 104 microseconds. In this illustration, a high to low transition from period B to period C has been distorted. This error can be corrected by means of an error correction firmware routine in accordance with the present invention. The foundation of this error correction routine is based on the principle that standard baud rates are derived from a common denominator. That common denominator is a unit of time equal to the time necessary to transmit a single bit at the highest baud rate under consideration. For a baud rate of 19.2 kilobits per second, this time is 52.083333 . . . microseconds, and for a baud rate of 9.6 kilobits per second, this time is 104.16666 . . . microseconds. If, e.g., the fastest baud rate that the communications hub communicates at is 19.2 k, the common denominator time would be 52 microseconds. In this case, the result of any timed value should fall at the boundary of 52 microsecond intervals. If the value does not fall at that interval, then it is rounded off the value to the nearest 52 microsecond interval.

The following error correction procedure simply complies with the step that is true:

Step 1: If the Remainder of (Measured Time/Interval Time) is less than 0.5, then:
the Corrected Time equals (the whole number result of (((Measured Time/Interval Time))*Interval Time).

Step 2: If the Remainder of (Measured Time/Interval Time) is equal to or greater than 0.5, then:
the Corrected Time equals (the whole number result of (((Measured Time/Interval Time))+1)*Interval Time).

In the example of FIG. 3, period B is 233 microseconds. To correct this, first divide 233 by 52 microseconds. The result is 4.48. The remainder, 0.48, is assigned the value of 48 because only unsigned whole number math is performed by the microcontroller. Next, if the remainder is less than 50 (which it is), then the correct time value is 208 or (4*52). If the same routine is applied to period C, the result will also be 208 microseconds, effectively stretching the pulse.

Figure 4:
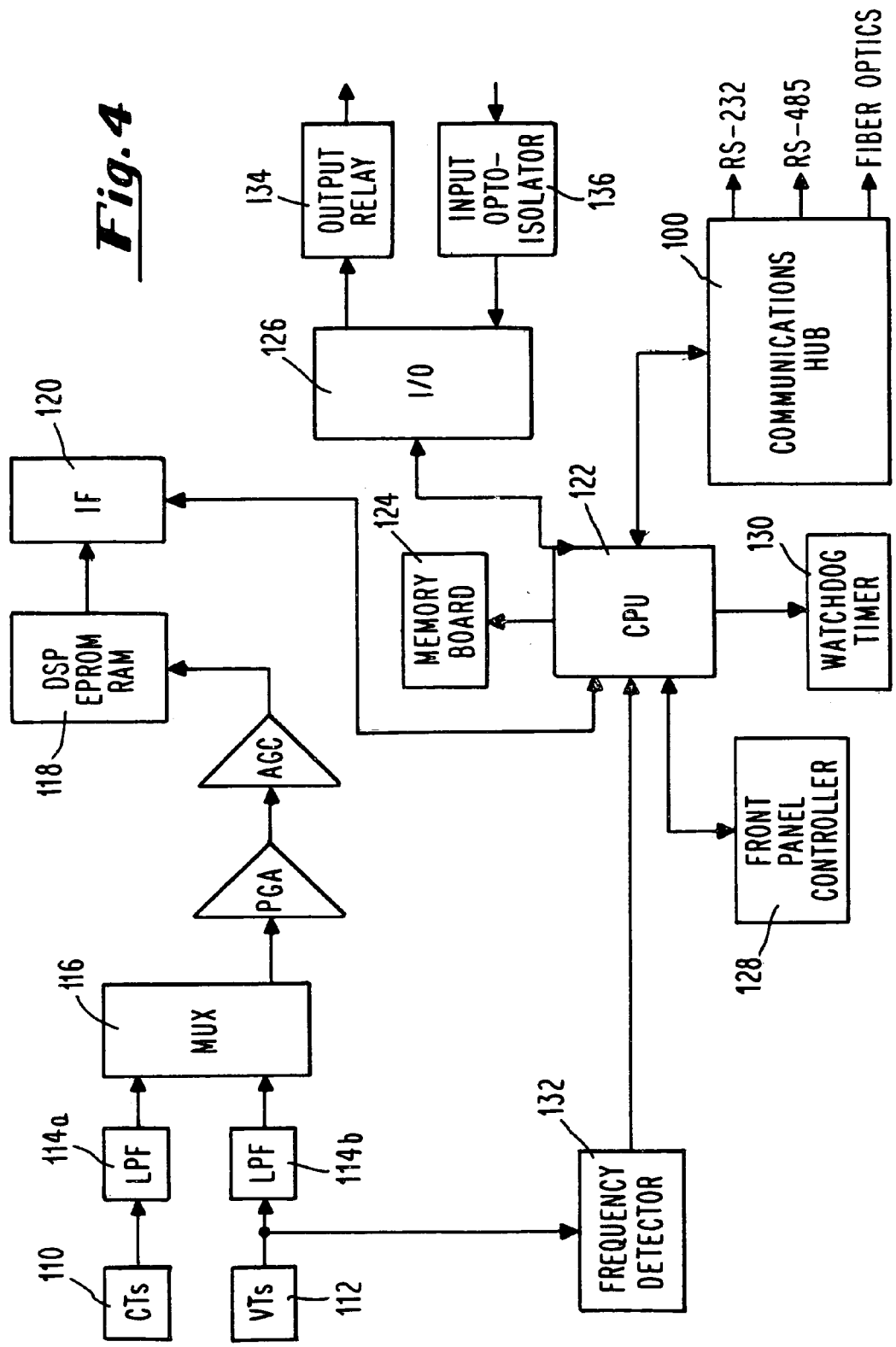
FIG. 4 schematically depicts a Power Control Device incorporating a digital serial communications hub in accordance with the present invention.

As mentioned, the communications hub 100 may be incorporated into ABB Power T&D Company's PCD2000 POWER CONTROL DEVICE. FIG. 4 schematically depicts such a device. As shown, the Power Control Device includes, in addition to the communications hub 100, current and voltage transformers 110 and 112; low pass filters 114a and 114b; a multiplexor 116; digital signal processing (DSP) circuitry and associated EPROM and RAM memory 118; an interface 120; a central processing unit (CPU) 122; a memory board 124; an input-output (I/O) circuit 126; a front panel controller 128; a watchdog timer 130; a frequency detector 132; an output relay 134, and an input opto-isolator 136.

The Power Control Device may be used by electrical utilities and industry to control and meter three-phase medium voltage electrical power. In a normal configuration, the device is the electronic control to a three-phase switch commonly referred to as a recloser. The Power Control Device is electrically connected to the recloser via three current transformers (CTs), three voltage (potential) transformers (PTs), and three actuators. The CTs are the recloser's current sensing elements. They transmit to the Power Control Device an electrical signal that is in proportion to the current flowing through each of the recloser's three poles. The PTs are the recloser's voltage sensing elements. They transmit to the PCD2000 an electrical signal that is in proportion to the voltage that is present on each of the recloser's three poles. The three actuators are the devices that open and close the recloser's contacts. The actuators are electrically connected to the Power Control Device and their operation is controlled by that device. The CTs, PTs, and actuator provide the Power Control Device with the information and the control to monitor electrical power and make recloser open and/or close decisions. The Power Control Device has optional inputs and outputs (I/Os) that may be programmed to perform a variety of functions for example transmit an alarm if any of the three poles experience an over voltage or under voltage condition. The Power Control Device may be connected in a cluster of PCDs controlled from a remote location. This is accomplished by either a communications board type 3 or a communications board type 4. (The difference between the two boards is the Comm Type 4 has fiber optic communications port.) These two boards provide the comminations link from the Power Control Device to the outside world. This link provides a means of indicating to the outside world the present and past status of the recloser, the Power Control Device, and power flow. It also provides a link for reprogramming the PCD's numerous optional settings.

In sum, the present invention provides a digital serial communications hub that (1) has the ability to delay, route and regenerate data on the fly at mixed baud rates, mixed character framing bits, and mixed protocols without prior setup; (2) stores and retrieves serial data in the time domain; and (3) employs a simple and reliable error correction routine made possible by the time domain format of the data. The preferred embodiments described herein represent exemplary implementations of the invention. However, the scope of protection of the following claims is not intended to be limited to the specific embodiments disclosed herein.

What is claimed:

1. A digital serial communications hub comprising:
(a) a controller; and,
(b) a plurality of receiver-transmitter units operatively coupled to the controller;
wherein the controller is programmed to delay, route and regenerate data at mixed baud rates, mixed character framing bits and mixed protocols by, in part, digitizing and quantizing all received data in a time domains, independent of a protocol necessary for understanding said received data.

2. A digital serial communications hub as recited in claim 1, wherein the controller is further programmed to filter for error correction and store in memory the received data.

3. A digital serial communications hub as recited in claim 2, wherein the controller is further programmed to perform the following steps:
  (i) measuring the received data's transition times values in the time domain, and storing in memory the transition time values;
  (ii) analyzing the transition time values to determine if any error correction should be applied to the transition time values, and if so, applying an error correction procedure to the transition time values in need of error correction; and
  (iii) reconstructing the received data with error correction.

4. A digital serial communications hub as recited in claim 3, wherein the correction procedure of step (ii) further comprises:
  (a) determining a common denominator of a standard baud rate, wherein the common denominator is a unit of time equal to a time employed to transmit a single bit at a certain baud rate;
  (b) dividing each transition time value of the received data by the common denominator; and,
  (c) rounding off each transition time value to a closest interval equal to an integral number of common denominator periods.

5. A digital serial communications hub as recited in claim 3, wherein the controller is a microcontroller including a time module, and the step of reconstructing the received data is performed by sequentially moving the transition time values into a timer module wherein the transition time values are used to reconstruct the received data, including the use of a port identifier associated with the received data to determine a port or ports on which the received data will be re-transmitted.

6. A digital serial communications hub as recited in claim 1, wherein the controller is further programmed to delay retransmission of the received data.

7. A method for operating a digital serial communications hub, comprising
  (i) digitizing and quantizing all received data in a time domain said received data further comprising mixed baud rates, mixed character framing bits, and mixed protocols;
  (ii) error correcting the received data in the time domain;
  (iii) retransmitting the error corrected received data, mixed baud rates, mixed character framing bits and mixed protocols, independent of a protocol necessary for understanding said received data.

8. A method as recited in claim 7, further comprising the following steps:
  (i) measuring the received data's transition times in the time domain; and,
  (ii) storing in memory the data transition time values;
  (iii) analyzing the measured time values to determine if any error correction should be applied to the data transition time values and, if so applying an error correction procedure to the data transition time values in need of error correction; and
  (iv) reconstructing the received data with error correction.

9. A method as recited in claim 8, wherein the error correction procedure of step (iii) further comprises:
  (a) determining a common denominator of a standard baud rate, wherein the common denominator is a unit of time equal to a time employed to transmit a single bit at a certain baud rate;
  (b) dividing each data transition time value of the received data by the common denominator; and rounding off each data transition time value to a closest interval equal to an integral number of common denominator periods.

10. A digital serial communications hub comprising:
  (a) a controller; and,
  (b) a plurality of receiver-transmitter units operatively coupled to the controller;
  wherein the controller is programmed to delay, route and regenerate data at mixed baud rates, mixed character framing bits and mixed protocols by, in part, digitizing and quantizing all received data in a time domain without knowledge of protocol, framing or other information necessary to digitizing or quantifying said received data.

11. A digital serial communications hub as recited in claim 10, wherein the controller is further programmed to filter for error correction and store in memory the received data.

12. A digital serial communications hub as recited in claim 11, wherein the controller is further programmed to perform the following steps:
  (i) measuring the received data's transition time values in the time domain, and storing in memory the transition time values;
  (ii) analyzing the stored transition time values to determine if any error correction should be applied to the transition time values, and if so, applying an error correction procedure to the transition time values in need of error correction; and,
  (iii) reconstructing the received data with error correction.

13. A digital serial communications hub as recited in claim 12, wherein the correction procedure of step (ii) further comprises:
  (a) determining a common denominator of a standard baud rate, wherein the common denominator is a unit of time equal to a time employed to transmit a single bit at a certain baud rate;
  (b) dividing each time value of the received data by the common denominator; and,
  (c) rounding off each time value to a closest interval equal to an integral number of common denominator periods.

14. A digital serial communications hub as recited in claim 12, wherein the controller is a microcontroller including a time module, and the step of reconstructing the received data is performed by sequentially moving the transition time values into a timer module wherein the transition time values are used to reconstruct the received data, said reconstruction step further comprising the use of a port identifier associated with the received data to determine a port or ports on which the received data will be retransmitted.

15. A digital serial communications hub as recited in claim 10, wherein the controller is further programmed to delay retransmission of the received data.

16. A method for operating a digital serial communications hub, comprising:
  (i) digitizing and quantizing all received data in a time domain said data further comprising mixed baud rates, mixed character framing bits, and mixed protocols;
  (ii) error correcting the received data in the time domain;
  (iii) retransmitting the error corrected received data, mixed baud rates, mixed character framing bits and mixed protocols, without knowledge of protocol, framing or other information necessary to digitizing or quantifying said received data.

17. A method as recited in claim 16, further comprising the following steps:
   (i) measuring the received data's transition time values in the time domain;
   (ii) storing in memory the transition time values;
   (iii) analyzing the transition time values to determine if any error correction should be applied to the transition time values and, if so; applying an error correction procedure to the transition time values in need of error correction; and
   (iv) reconstructing the received data with error correction.

18. A method as recited in claim 17, wherein the error correction procedure of step (iii) further comprises:
   (a) determining a common denominator of a standard baud rate, wherein the common denominator is a unit of time equal to a time employed to transmit a single bit at a certain baud rate;
   (b) dividing each time value of the received data by the common denominator; and,
   (c) rounding off each time value to a closest interval equal to an integral number of common denominator periods.

* * * * *